Figure 1:
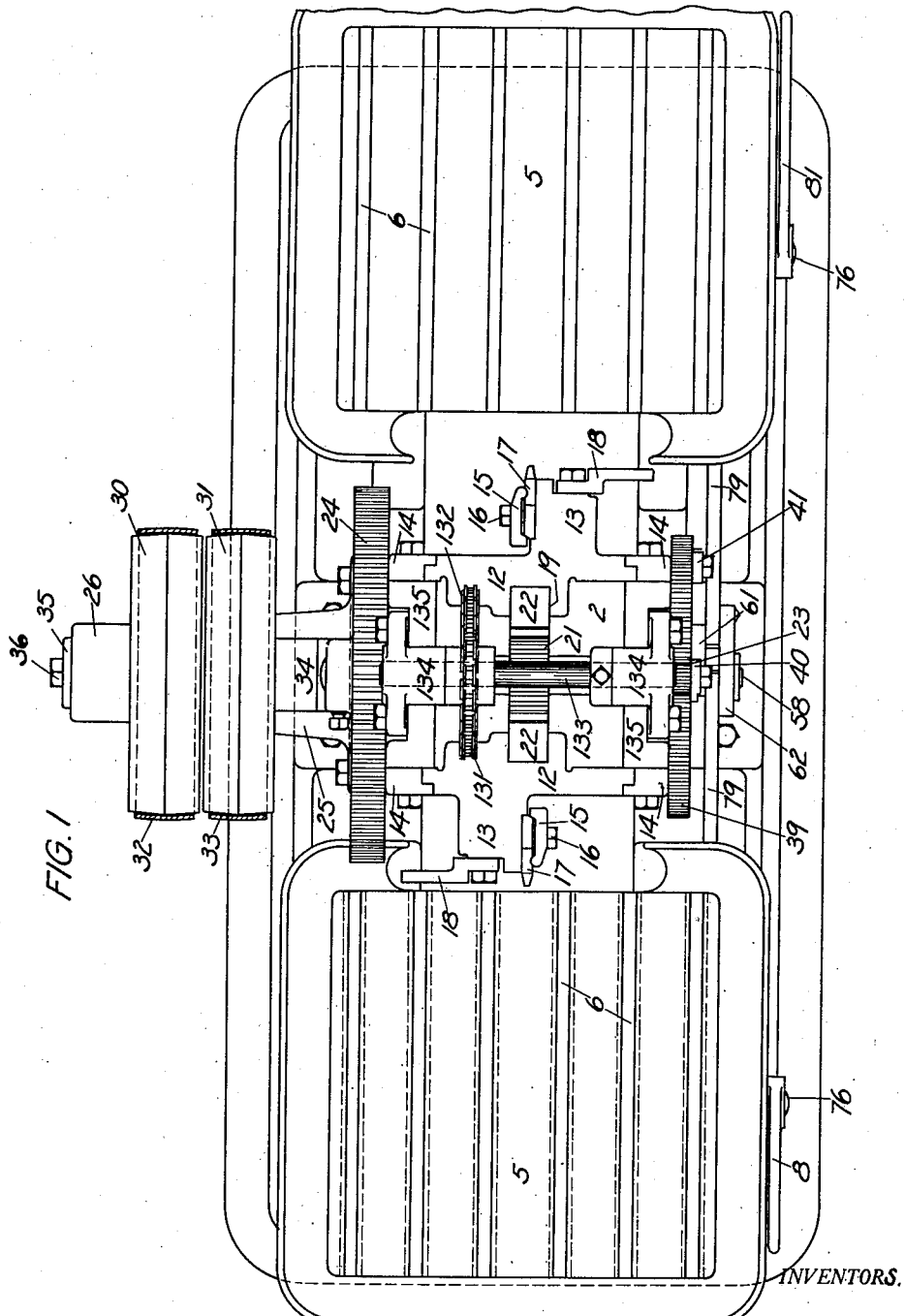

Dec. 17, 1929.  J. L. PERKINS ET AL  1,739,609

MACHINE FOR BROACHING SPIRAL GEARS

Filed May 4, 1927  4 Sheets-Sheet 1

INVENTORS.
Julian L. Perkins,
Hiram L. Croft,
By Frank A. Cutter, ATTORNEY.

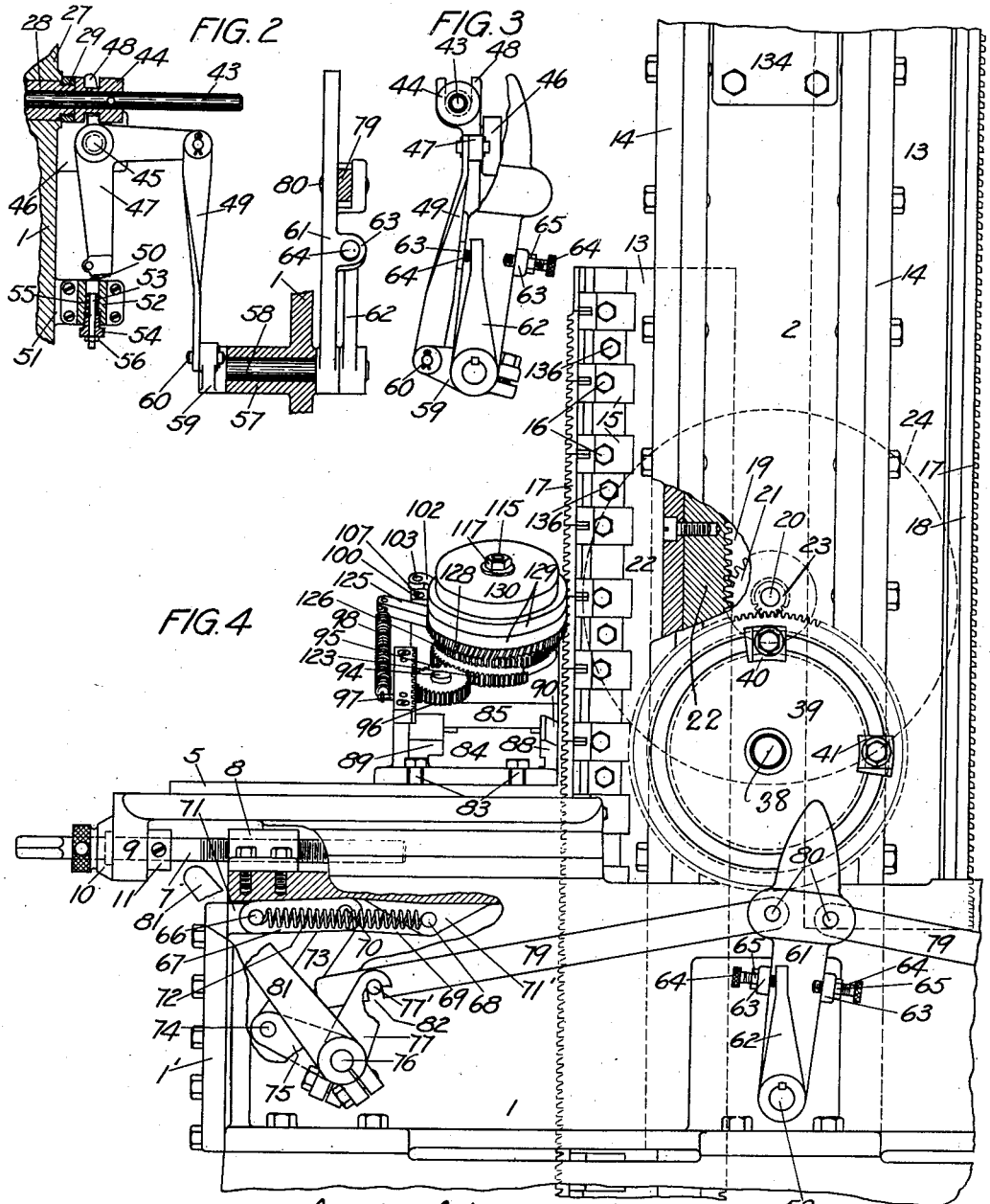

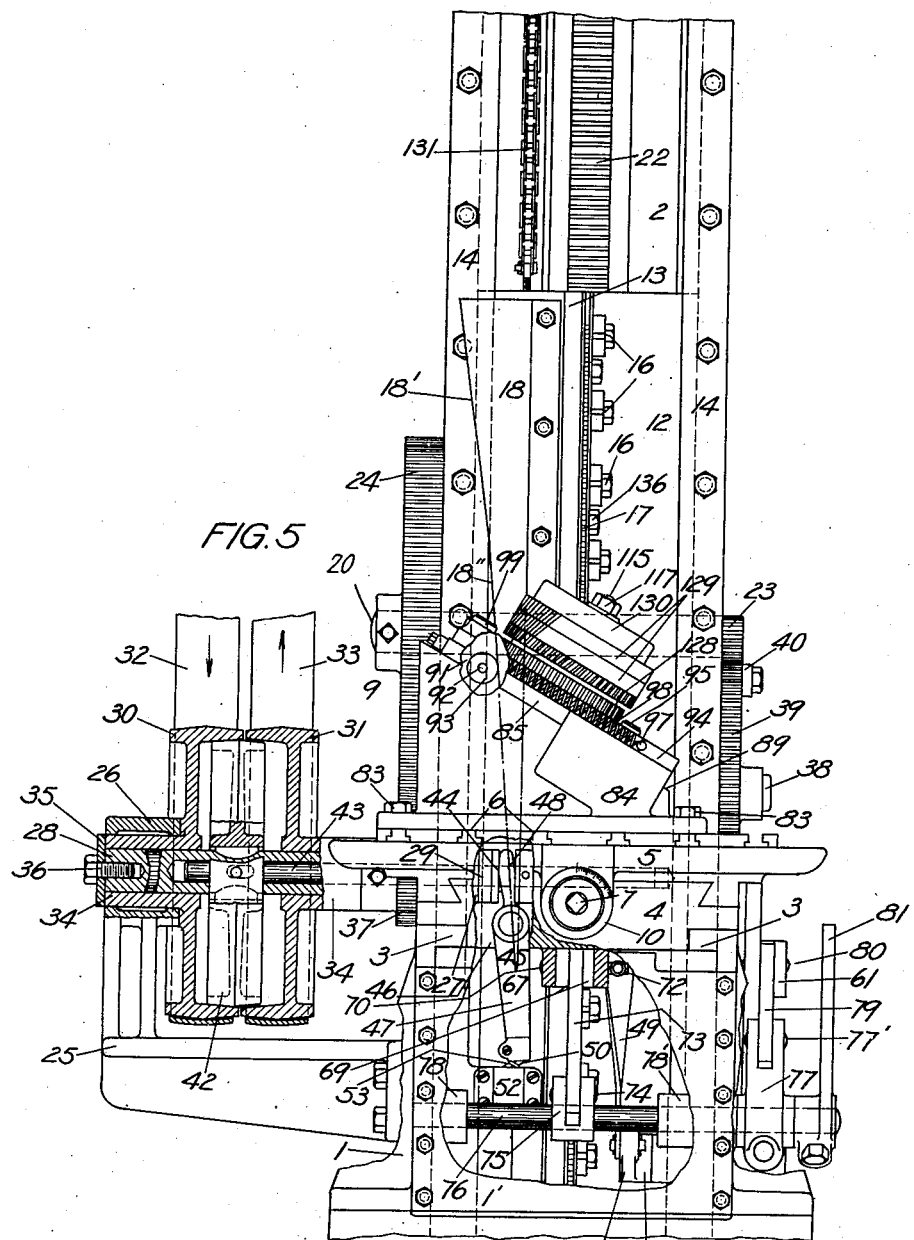

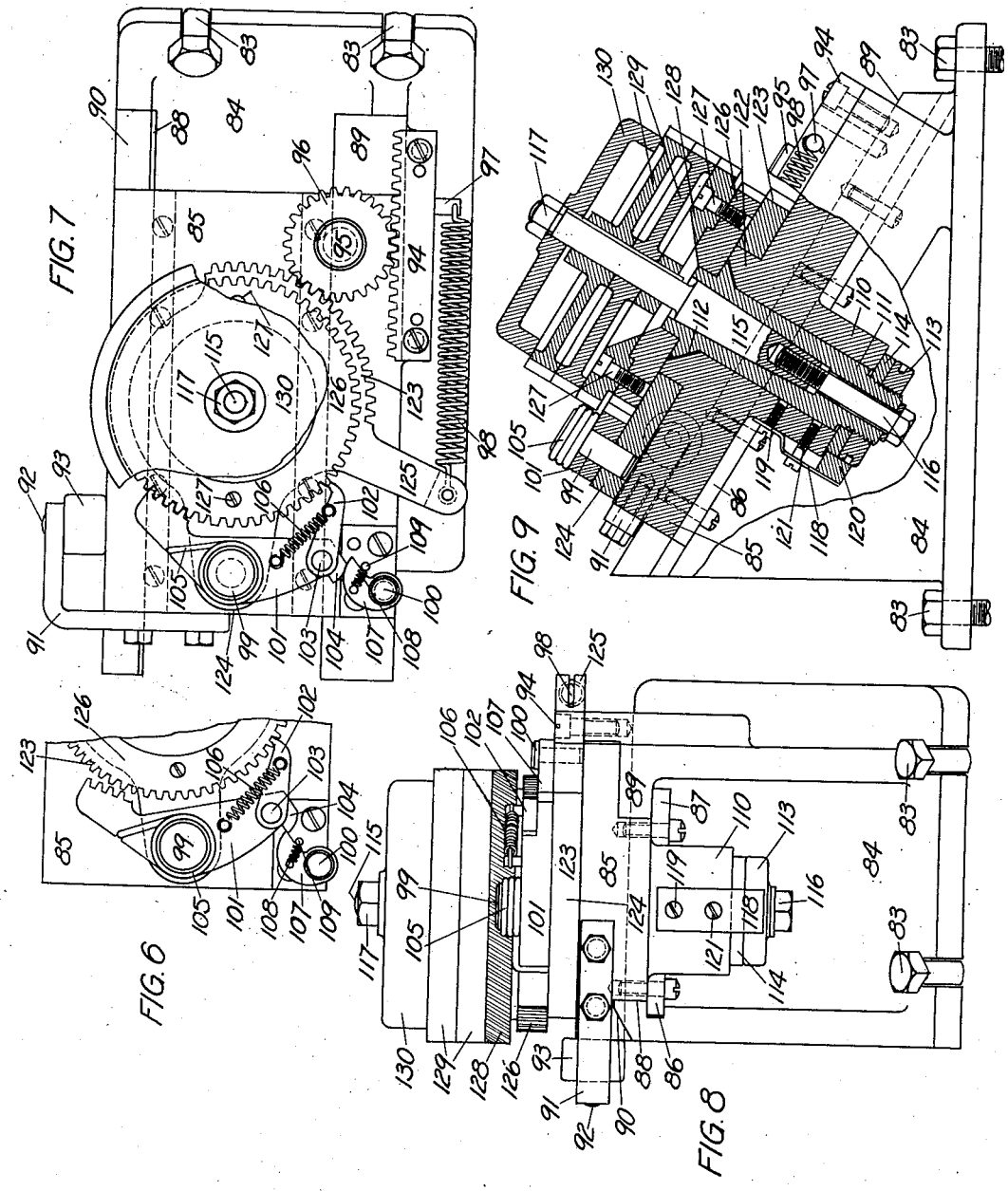

Patented Dec. 17, 1929

1,739,609

UNITED STATES PATENT OFFICE

JULIAN L. PERKINS AND HIRAM D. CROFT, OF SPRINGFIELD, MASSACHUSETTS, ASSIGNORS TO PERKINS MACHINE AND GEAR COMPANY, OF SPRINGFIELD, MASSACHUSETTS, A CORPORATION OF MASSACHUSETTS

MACHINE FOR BROACHING SPIRAL GEARS

Application filed May 4, 1927. Serial No. 188,765.

Our invention relates to improvements in machines for broaching spiral gears, and the like, and generally and preferably consists of a frame from which in the center rises a column, tool-carrying rams arranged to reciprocate on opposite sides of said column, carriages mounted on said frame on opposite sides of said columns, mechanism intermittently to reciprocate said carriages, work holders mounted on said carriages, and equipped with rotating and indexing mechanisms for the work on said holders, driving mechanism for said rams, and automatically reversing mechanism for said driving mechanism, these several elements structurally and in combination with each other being new and novel, and the driving, reversing, work-rotating and indexing mechanism being properly timed relatively, together with such other parts and members as may be necessary or desirable in order to render the machine complete and serviceable in every respect, all as hereinafter set forth.

One object of our invention is to produce a machine capable of broaching spiral gears accurately and expeditiously, yet which is also capable of other uses, such as for straight broaching for example.

With this machine, as we prefer to construct it, double the amount of work can be done, and different types of work can be done at the same time, by merely mounting on the two carriages the fixtures required for the different types.

Another object is to provide a machine of this class with simple yet highly efficient means for intermittently reciprocating the work carriages.

A further object is to provide a work holder that is capable of handling to the best advantage spiral-gear blanks, and having as an element thereof comparatively simple indexing means which is, nevertheless, certain and accurate in operation.

A still further object is to afford means for changing the directions of the rams, and bringing about other direction changes, which is entirely adequate and dependable for these purposes, although comparatively simple both structurally and functionally.

Other objects and advantages will appear in the course of the following description.

A preferred embodiment of the invention whereby we attain the objects and secure the advantages of the same, is illustrated in the accompanying drawings, and we will proceed to describe the invention with reference to said drawings, although it is to be understood that the exact form, construction, arrangement, etc., of the parts in various aspects are not material and may be modified without departure from the spirit of the invention or exceeding the scope of what is claimed.

In the drawings, in which like reference characters designate like parts throughout the several views, Figure 1 is a top plan of a machine, without the work-holding fixtures, which embodies a practical form of our invention as aforesaid; Fig. 2, a detail, partially in elevation and partially in section, of the operating mechanism for the pulley clutch, as viewed from the left-hand side; Fig. 3, a front end elevation of said mechanism; Fig. 4, a front elevation of said machine, with one of the work-holding fixtures in position on the left-hand carriage, that portion of the frame which is at the right of the column being broken off, and the parts and members supported thereon omitted; Fig. 5, a left-hand end elevation of said machine, with parts in section and broken out; Fig. 6, an enlarged detail, in what may be termed top plane, of parts of the work-rotating and -indexing mechanisms, showing the detent out of engagement with the index-wheel; Fig. 7, an enlarged top plan of said last-named mechanisms complete except that certain parts are broken away, as said mechanisms would appear with the work-holder axis perpendicular to the horizon, and positioned with the front ends of the bed and slide at the right; Fig. 8, an enlarged, rear end elevation of said last-named mechanisms disposed with the aforesaid axis perpendicular as, before, and Fig. 9, an enlarged, central, longitudinal, vertical section through said last-named mechanisms.

The upper end portions of the column and the corresponding portion of one of the rams, in Figs. 4 and 5, are broken off.

The frame of the machine, which as a whole is indicated by the numeral 1, may generally be of any suitable shape and construction, except that it has a column 2, and two pairs (preferably) of carriage-supporting flanges 3, one pair extending to the right and the other to the left from said column. A work carriage 4 is mounted to slide on each pair of flanges 2. The carriage 4 is cut away underneath and adjacent to the front and rear edges thereof to receive the flanges 3. Slidingly arranged on each carriage 4 is a bed 5 having in the top thereof the usual inverted T-slots, as 6.

Each bed 5 is adjusted on its carriage 4 by means of a horizontal screw 7 in threaded engagement with a lug 8 secured to said carriage at the outer end thereof, said screw being received in a lug 9 that depends from said bed at the outer end, and held against longitudinal movement therein by an outside gauge-nut 10 and an inside collar 11. The forward terminal of the screw 7 is shaped to receive a wrench, and by applying said wrench thereto and rotating said screw, the latter is moved longitudinally, by reason of its engagement with the lug 8, and the bed 5 is moved with said screw, the direction depending, of course, on the direction in which the screw is rotated. By this means and in this manner, therefore, the bed 5 is adjusted to enable the work to be located by the action of the carriage 4 on which said bed is mounted, in the proper relationships with the cutting or broaching tool which acts on the same.

Slidingly arranged on opposite sides of the column 2 are two vertical rams 12 having on their outer sides projecting, broaching-carrying parts 13—13. The rams 12 are held to the column 2 by means of two pairs of gibs 14 bolted to said column. On the front side of the part or carrier 13 of the left-hand ram 12, and on the back side of the part or carrier 13 of the right-hand ram 12, respectively, are secured, by means of pluralities of clamps 15 and bolts 16, two vertical broaches or lines of broaches 17. For the purpose of this description each line of broaches 17 will be considered as a single broach which to all intents and purposes it is.

The broaches 17 are positioned respectively with their teeth projecting beyond the right-hand and left-hand, or outermost, oppositely-disposed sides of the carriers 13. A vertical cam plate 18 is bolted to the left-hand side of the left-hand carrier 13, behind the broach 17 attached to said carrier; and a similar cam-plate is similarly attached to the right-hand side of the right-hand carrier 13, in front of the broach 17 attached to said last-named carrier. The back edge of the left-hand cam-plate 18 inclines somewhat abruptly from above downwardly and forwardly for about one-third of its length, and then continues at a less abrupt incline to the bottom, as represented at 18′ and 18″, respectively, in Fig. 5, and the front edge of the right-hand cam-plate 18 is similarly formed, but inclines downwardly and rearwardly.

The minimum traverse required of the part 18″ of each cam plate 18, which is fixed or determined by the distance between parallel vertical lines touching the top and bottom ends of the inclined edge of said part, must be equal to the length of a cord taken at the extreme depth of a tooth plus the length of a tangent established by the helical angle and the width of the part of the work being operated on, such combined length of chord and tangent in the art of developing spiral gears being technically known as the chord of the gear.

The upper part of the column 2 has therein a wide slot 19. The slot 19 is in the longitudinal center of the machine. Mounted on and secured to a shaft 20, which is journaled in the column 2 in the transverse center of the machine, is a pinion 21, said pinion being located in the slot 19. Secured to adjacent sides of the rams 12 are racks 22 which extend into the slot 19 and intermesh with the pinion 21. The pinion 21, when rotated in one direction, actuates one of the racks 22 with its ram 12 upwardly, and the other rack 22 with its ram 12 downwardly, and, when said pinion is rotated in the opposite direction, the directions of said racks and rams are correspondingly altered.

Secured to the forward terminal of the shaft 20, in front of the column 2, is a pinion 23, and mounted on and secured to the rear terminal of said shaft, behind said column, is a gear 24. A bracket 25 is bolted to the back side of the frame 1, in the transverse center thereof, extends rearwardly from said side, and has at the rear end an upstanding part with a bearing 26 at the top. Journaled at the inner terminal in a bearing part 27 of the frame 1 is a shaft 28, see Fig. 2. The shaft 28 at the inner end is screw-threaded to receive a nut 29 at the right of the bearing 27. Mounted on the shaft 28 behind the frame 1 are two pulleys 30 and 31, the latter being in front of the former. The pulleys 30 and 31 are respectively driven by belts 32 and 33 traveling in the directions of arrows on said belts in Fig. 5. Each of the pulleys 30 and 31 has a hub 34 that extends outwardly from said pulley. The hub of the pulley 30 is journaled in the bearing 26, and said hub forms a bearing for the shaft 28 at the outer or rear terminal. A washer 35 is secured, by means of a bolt 36 passing through said washer and tapped into the axial center of the shaft 28, to the rear end of said shaft, said washer extending over the rear end of the hub 34 of the pulley 30. A pinion 37 is mounted on and secured to the shaft 28 at the front end of the hub 34 of the pulley 31. The pulleys 30 and 31 are held against endwise movement on the shaft 28, and said shaft is held against endwise movement by the washer 35, the bearing 26, the hub of the pinion 37, and the bearing 27 and the nut 29. The pinion 37 intermeshes with the gear 24 above. Mounted on a stud 38, which projects forwardly from the column 2, is a gear 39 that intermeshes with the pinion 23. Secured to the front side of the gear 39 are two dogs 40 and 41.

The friction clutch 42 is mounted on and keyed or otherwise secured to the shaft 28 inside of the pulleys 30 and 31. When the clutch 42 is moved rearwardly, it frictionally engages the pulley 30 and said pulley is thereby caused to drive the shaft 28, and, when said clutch is moved forwardly on said shaft, it frictionally engages the pulley 31 and causes the shaft to be driven by said last-named pulley. At the time the clutch 42 is in engagement with either pulley said clutch is out of engagement with the other pulley. A rod 43 is slidingly arranged in the shaft 28, and extends through the hub of the clutch 42, and said hub is pinned or otherwise rigidly secured to said rod. A spool 44 is mounted on and pinned or otherwise secured to the rod 43 in front of the inner end of the shaft 28, said spool having the usual annular groove therein.

Pivotally connected at 45 with a lug 46 extending forwardly from the back side of the frame 1, adjacent to the spool 44, is a bellcrank-lever 47 having a yoke 48 that extends upwardly into engagement with the slotted part of said spool. One arm of the bell-cranklever 47 projects forwardly and has pivotally connected with the front end thereof the upper end of a link 49, while the other arm of said bell-crank-lever extends downwardly, and has set in the bottom thereof a pin 50. Arranged in a passage formed in and between a lug 51, which extends from the frame 1 below the lug 46, and a keeper 52 secured to one side of the lower lug, is a vertical plunger 53. The plunger 53 has a head at the top between which and a cap 54 tapped into the bottom of the passage wherein is located said plunger is a spring 55. The plunger 53 extends downwardly through the cap 54, and the lower terminal of said plunger is screwthreaded to receive a nut 56. The aforesaid head of the plunger 53 has a protruding part in the path of a corresponding protruding part at the bottom of the pin 50, and serves as a stop or check to prevent lost motion or back-lash on the part of the bell-cranklever 47. The nut 56 determines the amount of projection of the plunger 53 at the top, and enables such amount to be changed. The spring 55 yields to permit the bell-cranklever to be rocked into either one of its extreme positions, the plunger 53 then being momentarily forced downwardly by the pin 50 to enable the latter to pass. The tension of the spring 55 is increased or decreased by screwing the cap 54 farther into or out of the passage in which said spring is placed.

Journaled in a bearing 57, which projects inwardly from the front side of the frame 1, is a rock shaft 58. Mounted on and secured to the shaft 58, behind the bearing 57, is a rocker arm 59, and the lower end of the link 49 is pivotally connected at 60 with the outer end of said arm. The arm 59 extends to the left from the shaft 58. Loosely mounted on the shaft 58, in front of the frame 1, is an arm 61 which extends upwardly into the paths of the dogs 40 and 41, and mounted on and secured to said shaft, in front of said arm, is a rocker arm 62. The arm 61, intermediate of its ends and at opposite edges, is provided with two forwardly extending lugs 63 tapped to receive two thumb-screws 64 equipped with set-nuts 65. The arm 62 is shorter than the arm 61, and the upper terminal of the shorter arm is disposed in the space between the inner ends of the screws 64, which space is considerably greater than the thickness of said terminal, and can be increased or decreased, as may be needed, by turning said screws outwardly or inwardly, accordingly.

When the gear 39 is rotated to the right, the dog 41 encounters the arm 61 and rocks the same on the shaft 58 to the left, and, when said gear is rotated to the left, the dog 40 encounters said arm and rocks it to the right. The arm 61, in rocking to the left, carries the right-hand thumb screw 64 into contact with the arm 62, and then, by reason of such engagement, causes said last-named arm and the shaft 58 to be rocked in the same direction, with the result that the arm 59 is rocked downwardly and takes with it the link 49, and as a consequence the bell-crank-lever 47 is rocked on its pivot 45 in the direction to move the rod 43, through the medium of the yoke 48 and the spool 44, to the right, and said rod carries the clutch 42 out of engagement with the pulley 30 and into engagement with the pulley 31. Contrariwise, when the arm 61 is rocked to the right, the left-hand thumb-screw 64 is moved into contact with the arm 62 and rocks the same and the shaft 58 in the opposite direction to that in which it was rocked before, with the result that the arm 59 is carried upwardly and takes with it the link 49, and as a consequence the bell-crank-lever 47 is rocked on its pivot, through the same medium as before, to the left, and said rod carries the clutch 42 out of engagement with the pulley 31 into engagement with the pulley 30.

When the shaft 28 is driven by the pulley 30, the pinion 37 drives the gear 24 to the right, and, through the medium of the shaft 20, the pinion 21, and the racks 22, causes the left-hand ram 12 to descend and the right-hand ram 12 to ascend; and, when said shaft is driven by the pulley 31, said first-named gear is rotated to the left, and, through the same medium as before, causes the left-hand ram to ascend and the right-hand ram to descend.

At each end of the frame 1 is a removable plate 1', and extending inwardly from said plate at the top is a lug 71. Pivotally connected at 66 with the lug 71, at each end of the frame 1, is a pair of links 67, and pivotally connected at 68 with the carriage 4 is a second pair of links 69. Contiguous ends of the links 67 and 69 are pivotally connected at 70. The pivot 68 is received in a pair of lugs 71' on the under side of the carriage 4 approximate to the center thereof. A spring 72 has its ends attached to the pivots 66 and 68, and is adapted to prevent the links 67 and 69 from accidentally swinging downwardly when disposed in locked position, with the carriage 4 then advanced, because said links, upon being operated to advance said carriage, carry the pivot 70 to a little above the plane in which said first-named pivots are located, thus locking said links and said carriage in place. The spring tends to hold the aforesaid links in locked position, as will readily be seen. Extending downwardly and forwardly from the pivot 70 is a short link 73, and this link at its lower terminal is pivotally connected at 74 with the outer terminal of a rocker arm 75 mounted on and secured to a rock shaft 76. The shaft 76 is journaled in bearings 78 and 78' that extend inwardly from the back and front sides, respectively, of the frame 1. The arm 75 is inside of the frame 1, while mounted on and secured to the rock shaft 76 outside of said frame is a rocker arm 77. Pivotally connected at 77' with the upper terminal of the arm 77 is a long link 79. The link 79 at the inner terminal is pivotally connected at 80 with the arm 61. A similar link 79 is similarly connected with the arm 61 and extends to the right from said arm to form part of the actuating mechanism for the carriage at that end of the machine.

It is desired at this point to call attention to the fact that the toggle mechanism for the left-hand carriage 4 only is illustrated in connection herewith and described in detail, and that the same thing is true in regard to the work-holding elements mounted on the bed 5 of said carriage, the work-holding elements for the right-hand carriage being omitted entirely from both drawings and detailed description, as unnecessary for a clear understanding of the machine.

A hand lever 81 is mounted on and secured to the rock shaft 76 in front of the rocker arm 77. Preferably the arms 75 and 77 and the lever 81 are mounted for adjustment on the shaft 76, slit hubs and bolts of usual construction being here employed for that purpose.

The link 79 is notched or recessed at 82 to receive the pivot 77' and enable said link to be swung upward on the pivot 80 to disengage the link from said first-named pivot, as it is necessary to do when the carriage 4 is operated by means of the hand lever 81. To facilitate the manipulation of the link 79, when engaging the same with and disengaging it from the pivot 77', said link is made long enough to extend forward beyond the arm 77.

The movement to the left imparted to the arm 61 by the dog 41 causes to be imparted, through the medium of the link 79 and the rocker arm 76, a partial rotation to the rock shaft 76, and the arm 75 is rocked downwardly. The arm 75 in rocking downwardly carries with it the link 73, with the result that the links 67 and 69 are swung downwardly on their pivots 66 and 68, and, by means of said last-named links, the carriage 4 is actuated to the left or outwardly. The links 67 and 69, upon being moved initiatively at this time by the link 73, in passing through the plane common to the pivots 66 and 68, cause the carriage 4 to be slightly advanced, but this movement does not occur while broach 17 is making its cut. The movement to the right of the arm 61 causes the carriage 4 to be moved to the right to position the work so that it can be rolled through the cutting field, by drawing to the right the link 79, rocking upwardly the arm 75, and swinging upwardly the link 73 and the links 67 and 68, which latter are first forced into line with each other and then above said line into contact with the carriage 4, for the reason hereinbefore explained, and yieldingly held by the spring 72.

Due to the primary or initial amount of lost motion permitted between the arms 61 and 62, the carriage 4 is actuated to withdraw the work from the cutting field, while the left-hand ram 12 is descending, and before the clutch 42 is shifted to cause said ram to ascend, and said carriage remains in said retracted position until just before the ram in ascending arrives at the upper end of the stroke, when the carriage is advanced again to relocate the work in position to be carried through the cutting field, and then said clutch is shifted to cause said ram to descend. Thus it is seen that the carriage is reciprocated between the times that the ram arrives at the ends of its travel and has its direction changed at said ends.

Bolted at 83 to the bed 5, at the left-hand side of the column 2, is a bed 84, the top of which inclines downwardly and forwardly at an angle to the adjacent broach 17 which is equal to the special angle of the gears to be cut. This bed is a part of the work-holding fixture or work holder, and has thereon a slide 85. In practice, a fixture of a similar type is provided on the right-hand bed 5, if the machine is to be employed to the best advantage for cutting the largest practical number of spiral gears in a given time. The slide 85 is held in place on the bed 84 by means of rightand left-hand gibs 86 and 87, respectively, fastened by screws to the underside of inwardly extending flanges at the top of said bed, said flanges being respectively designated by the numerals 88 and 89. The right-hand edge of the bed 84 at the top is beveled from above downwardly and to the right, as represented at 90, to assist in taking the thrust from the left-hand broach 17 during the cutting operation.

An angular bracket 91 is bolted to the back side of the bed 84, and extends forwardly in parallel relation with the right-hand side of said bed, and a spindle 92 is journaled in the free terminal of said bracket and in the adjacent side of the bed. On the spindle 92 is a roll 93 between the bed and the bracket arm, said roll being in the path of the left-hand cam plate 18. Rigidly attached to the bed 84, on the left-hand side and near the bottom thereof, is a rack 94 with its teeth on the inner edge. A stud 95 projects from the top of the slide 85 near the lower or front end thereof, and a pinion 96 is mounted on said stud and intermeshes with said rack. A pin 97 extends outwardly from the rack 94, and the front end of a spring 98 is attached to said pin.

Studs 99 and 100 extend above the top of the slide 85 near the upper or rear end thereof, the latter being at the left of the former. Mounted on the stud 99 is a detent 101 having teeth on the front edge of the inner-terminal portion thereof and provided at the outer terminal with a pawl 102 which is pivotally connected with said detent at 103. The outer end of the detent 101 is offset rearwardly to form an arcuate lug 104. A spring 105 is arranged on the stud 99 and in engagement with the detent 101 in a manner to rock said detent to the right; and a spring 106 has its ends attached to said detent and the pawl 102, respectively, and exerts an inward pull on said pawl.

A dog 107 is mounted on the stud 100, which latter is set in the top of the slide 85, and a spring 108 normally retains said dog in contact with a pin 109 set in said top forward and at the right of said stud. One end of the spring 108 is attached to the pin 109, and the other end of said spring is attached to the dog 107. This dog is in the path of the detent lug 104, and has an arcuate edge over which the arcuate edge of the lug 104 rides.

On the underside of the slide 85 is a hub 110, and journaled in said hub and said slide above is a hollow spindle 111. The hollow spindle 111 has near the top a tapered flange 112 which is received in a tapered seat at the upper end of the bore in the slide 85. The spindle 111 extends below the hub 110, where said spindle is externally screw-threaded to receive a nut 113, with a washer 114 between said nut and the bottom of said hub. The nut 113 is set up to draw the flange 112 onto its seat with the proper amount of tightness. The bore in the spindle 111, except at the lower terminal, is tapered to receive the tapered part of an arbor 115. A bolt 116 is introduced into the lower end of the bore in the spindle 111 and tapped into the lower or inner terminal of the arbor 115, and by means of said bolt said arbor is drawn tightly into engagement with said spindle and rotates therewith. The arbor 115 is screw threaded at the top to receive a nut 117.

A tension spring 118 is secured by a screw 119 to the back side of the hub 110, and at the lower terminal is provided with a friction block 120 arranged to bear on the nut 113 and the washer 114, the amount of tension being regulated by means of a screw 121 which passes through said spring to be tapped into said hub below said first-named screw. The purpose of the spring 118, with its block 120, is to prevent back-lash on the part of the spindle 111 and the members carried thereby.

There is also a hub 122 at the top of the slide 85, and loosely mounted on said hub is a segmental-gear 123. The segmental-gear 123 has a rearwardly extending arm 124 in which the stud 99 is set and on which the detent 101 is located, and said segmental-gear also has an outwardly extending arm 125 to the outer end of which the rear end of the spring 98 is attached. The teeth of the segmental-gear 123 intermesh with the pinion 96, and the teeth of the detent 101 are normally in locking engagement with said segmental-gear, while the pawl 102 normally only loosely engages the same.

Mounted on the spindle 111 at the upper end and keyed thereto is a gear which constitutes an index-wheel 126. Mounted on the index wheel 126, and secured thereto by means of screws 127, is a serrated support 128 having teeth thereon that are similar to the teeth of the spiral gears cut by this machine, and in other respects corresponding with said gears.

The teeth of the broaches 17 correspond with the pressure angle of the gears broached in this machine, and the pitch diameter of the segmental-gear 123 is the same as that of said gears.

Two gear blanks are represented at 129 as being mounted on the arbor 115 above the serrated support 128, and mounted on said arbor above said blanks is a shroud 130. The blanks 129 are keyed to the arbor 115; so also is the shroud 130. When the nut 117 is tightened, the shroud 130 and blanks 129 are forced hard against each other, and the under blank is forced hard against the serrated support 128, and said blanks are thus securely and rigidly held in place on the arbor 115, and must rotate with the spindle 111.

In place of the arbor 115, arbors may be provided and used which are capable, by reason of length, diameter, shape, etc., to accommodate a single gear blank or more than two gear blanks at a time, and blanks having different centers.

As the left-hand broach 17 is carried downwardly, by the descending ram 13 to which said broach is attached, to cause the latter to make its cut in the blanks 129, the associated cam-plate 18 acts on the roll 93 and actuates, through the medium of said roll and the bracket 91, the slide 85 upwardly or rearwardly, and, through the medium of the rack 94, the pinion 96, the segmental-gear 123, and the detent 101, causes the index-wheel 126 to be partially rotated in a contrary clockwise direction. It is the part 18″ of the cam-plate 18 that first acts to cause the slide 85 to be moved rearwardly, and thereby impart rotary motion to the segmental-gear 123. This initial rotary motion of the index-wheel 126, is, through the medium of the detent 101, the index-wheel 126, the spindle 111, and the arbor 115, imparted to the blanks 129, and said motion or movement is of the required amount to produce the spiral in the teeth cut by the broach 17 in said blanks. As the ram 13 approaches the lower end of travel, and with it the attached broach 17 and cam-plate 18, the more abruptly inclined part 18′ of said cam-plate 18 causes the slide 85 to be carried still further rearwardly with an accelerated motion, and the lug 104, which previously was in front of the dog 107, to be carried behind said dog. The back edge of the lug 104 encounters the front edge of the dog 107 and swings said dog, against the resiliency of the spring 108, rearwardly on its stud 100 until said lug passes clear of or behind the dog, and then said spring draws the dog forwardly again into contact with the pin 109. During the upward or rearward movement of the slide 85 the spring 98 is being expanded. When the ram 13 with the cam-plate 18 ascends the spring 98 contracts and draws the arm 125 forwardly, as the steep part 18′ of the cam-plate 18 passes up in contact with the roll 93, the slide 85 is moved downwardly or forwardly, and the segmental-gear 123 is caused to be partially rotated to the left, and to swing the arm 124 in the same direction. The lug 104 next comes into contact from the rear with the dog 107, rides over said dog, actuates the detent 101, against the resiliency of the spring 105, and withdraws said detent from engagement with the index-wheel 126. The movement of the detent 101 on the stud 99, that is imparted thereto by the contact between the lug 104 and the dog 107 which has just taken place, causes the pawl 102 to swing on the pivot 103 outwardly, against the resiliency of the spring 106, and to carry with it the index-wheel 126, which has just been released by said detent. The pawl 102 thus imparts a partial revolution to the index-wheel 126 in a contrary clockwise direction, the construction and arrangement of parts being such that the amount of rotation thus imparted to said index-wheel is equal to the distance between two adjacent work teeth. As the slide 85 continues to move forward, the lug 104 rides off of the dog 107, and the spring 105 immediately causes the detent 101 to reengage the index-wheel 126 and lock the same to the segmental gear 123. The narrower part 18″ of the cam plate 18 is now in contact with the roll 93, and, by the time said cam-plate arrives at the upper end of its travel, the slide 85 is in the extreme forward position. The broach 17 now commences to descend again. In this manner and by this means the work is partially rotated each time the broach makes a cut, and is indexed each time said broach ascends.

It is to be observed, in connection with the foregoing that, at the beginning of the down stroke of the broach, the work is already in its innermost position and with the part next to be cut forward of said broach. The cam plate part 18″ immediately causes to take place the movements which carry the work rearwardly across the broach and roll it, in a contrary clockwise direction, in contact therewith. The amount of rolling motion and travel of the work to complete the generating operation must not be less than the distance taken on a cord determined by the greatest depth of cut plus the length of a tangent determined by the helical angle and the length of the face of the work where said work is being operated on. By the time the part 18′ of the cam plate arrives at the roll 93, the work has been moved and rolled out of engagement with the broach. The carriage carries the work to the left while the part 18′ moves down. The work is caused to be rolled back into initial broaching position again by the upwardly ascending cam plate, and as said plate approaches the end of the up stroke, said work having been indexed at the beginning of said stroke, the carriage moves the work to the right again. Thus it is seen that the relative lengths of either broach and its associated cam plate are generally immaterial so far as the present invention is concerned, and that the length of travel of said broach, the length beyond that required to make the cut, is not material. In the present arrangement, and with the present cam plates, however, the stroke of each broach should not exceed the length of the associated plate.

Upon referring to Fig. 7, it will be observed that normally the point of the pawl 102 rests on one of the teeth of the index-wheel 126, in order to provide sufficient lost motion, when the parts are operated, to enable the detent 101 to be withdrawn from locking engagement with said index-wheel, before the action takes place by means of which said pawl is caused partially to rotate the index-wheel.

The serrated support 128 prevents the broach from making a ragged cut at the bottom of the slots in the lower blank 129, because said support, which is a facsimile of the spiral gears being cut, is moved with said blank through the cutting field wherein the broach operates, and is thus capable of upholding from the underside said lower blank, and insuring a clean and even cut therethrough each time the broach descends and the blank is rolled across said broach.

If a work holder similar to that just described, were located on the bed 5 at the right of the column 2, the operations of the movable parts of the second holder would be similar in all respects to those of the first, except that the movements of the corresponding parts in the two holders would by the reverse of each other at any identical instant of time, because the rams 13 reciprocate in opposite directions, although they reciprocate simultaneously.

The rams 13 are made to counterbalance each other by attaching a chain 131 to each and passing said chain over a pulley 132 mounted on a shaft 133. The shaft 133 is journaled in bearing brackets 134—134 which are let into extensions 135—135 at the top of the column 2, and bolted to said extensions.

The operation of the machine as a whole is briefly described as follows:

With the clutch 42 disposed as in Fig. 5, the pulley 30 is being rotated in the direction of the associated arrow, and is driving the shaft 28 in the direction to cause the left-hand ram 13 to descend and the right-hand ram 13 to ascend. The rams are driven by means of the pinion 37 on the shaft 28, the gear 24 on the shaft 20, and the pinion 21 on said shaft. The revolving shaft 20 carries with it the pinion 23 thereon, and said pinion at this time drives the gear 39 in a clockwise direction. Meanwhile the left-hand broach 17 is making its cut in the blanks 129. By the time the broach finishes its cut, the dog 41 on the gear 39 encounters the arm 61 and actuates the same on the rock shaft 58 to the left, thereby first causing the left-hand carriage 4 to be moved to the left to withdraw the blanks 129 from a position where they could otherwise encounter the broach when they are moved into initial position while the broach is ascending, through the medium of the intervening toggle mechanism, and then actuating in the same direction the rocker arm 62 and rocking said shaft to shift the clutch 42 from the pulley 30 to the pulley 31, with the result that the movements of the rams 13 are reversed. The right-hand carriage 4, is, of course, actuated inwardly at the time the other carriage is actuated outwardly. While the blanks 129 are out of contact with the broach 17 they are indexed, in the manner hereinbefore fully explained. The left-hand ram 13 is now traveling upwardly and the gear 39 is being rotated to the left, and said gear continues to rotate in that direction until the dog 40 encounters the arm 61, when said arm is actuated thereby to the right, and first causes the left-hand carriage 4 to be actuated inwardly to locate the blanks 129 again in position to be cut, and the right-hand carriage 4 to be retracted, and then rocks the arm 62 to the right to bring about another reversal of the rams, when the left-hand ram once more descends to make the second cut in the blanks 129.

If the blanks were not withdrawn from cutting position, after being indexed, and while moved forward and rolling to the right into initial position for the next cut, the portions of the blanks newly presented by the indexing mechanism for said cut would contact with the ascending broach, a condition which must be avoided.

These operations are repeated until the blanks are converted into complete spiral gears. The completed spiral gears are removed from the arbor 115, by taking off the nut 117 and the shroud 130, after first stopping the machine. Two more blanks are then placed in position on the arbor and secured by the shroud and nut, as were the first two, and the machine is started and continues in motion until said blanks are completely broached, similar cycles of operation occurring in cutting this pair as in cutting the first pair; and so on indefinitely.

In addition to the clamps 15 and the bolts 16 for securing the broaches 17 to the broach-carrying parts 13 of the rams 12, bolts 136 are also employed. The bolts 136 pass through the broaches 17 into screw-threaded engagement with the parts 13.

The roll 93 is of sufficient width to enable the carriage 4 to be moved outwardly and inwardly without moving said roll far enough to disengage it from the contacting cam-plate 18.

What we claim as our invention, and desire to secure by Letters Patent, is—

1. In a machine of the class described, a frame and a column, tool-carrying rams sliding on said column, work-holder carriages mounted on said frame to move in a straight line toward and away from said column, constantly-operating reciprocating mechanism for said rams, and intermittently-operating mechanism to reciprocate said carriages, whereby first one and then the other carriage is caused to approach the associated ram and stop, and the companion carriage is caused to recede and stop.

2. The combination, in a machine of the class described, with a frame, a reciprocating tool-carrying ram supported by said frame, and a carriage mounted for reciprocation on said frame, a work holder mounted on said carriage, means automatically partially to rotate the work on said holder, while said work is in the path of the tool carried by said ram, and means automatically to index said work while out of said path, of a movable member supported from said frame, reciprocating mechanism for said carriage between the latter and said member, and means intermittently to actuate said member first in one and then in the other direction, whereby said mechanism is caused to move said carriage first in one and then in the other direction, with a period of rest at the inner end of the travel of said carriage during which said tool is caused to operate on the work and the latter is rolled in contact therewith, and a period of rest at the outer end of said carriage during which said work is indexed.

3. The combination, in a machine of the class described, with a frame, and a carriage slidingly mounted on said frame, of a movable member supported from said frame, means intermittently to actuate said member first in one and then in the other direction, a rock shaft journaled in said frame and provided with arms, links pivotally connected with said frame, and said carriage and also with each other, a link pivotally connected with one of said arms, and a link pivotally connected with the other of said arms and with said movable member.

4. The combination, in a machine of the class described, with a frame, a tool-carrying ram arranged to reciprocate on said frame, and a carriage mounted for reciprocation on said frame toward and away from the path of said ram, of a movable member supported from said frame, means intermittently to actuate said member in opposite directions with periods of rest between, and toggle mechanism connected with said carriage and with said member, whereby said carriage is first moved toward said ram and then away from the same, with a period of rest of the carriage at each end of its travel.

5. The combination, in a machine of the class described, with a frame, and a carriage mounted for reciprocation on said frame, of an oscillatory arm supported from said frame, toggle mechanism between said carriage and said arm, and means intermittently to actuate said arm first in one direction and then in the other direction, whereby said mechanism is caused to move said carriage first in one and then in the other direction.

6. The combination, in a machine of the class described, with a frame, a carriage slidingly arranged on said frame, a rotary member supported from said frame, and provided with dogs, and means to rotate said member first in one and then in the other direction, of an oscillatory arm supported from said frame and extending into the path of said dogs, whereby said arm is actuated first in one and then in the other direction, and toggle mechanism between said carriage and said arm.

7. In a machine of the class described, a frame, a carriage slidingly arranged on said frame, an oscillatory member supported from said frame, means intermittently to rock said member first in one and then in the other direction, a rock shaft journaled in said frame and provided with arms, links pivotally connected with said frame and said carriage and also with each other, a link pivotally connected with adjacent ends of said first-named links and pivotally connected with one of said arms, and a link pivotally connected with the other of said arms and with said oscillatory member.

8. In a machine of the class described, a frame, a carriage slidingly arranged on said frame, an oscillatory member supported from said frame, means intermittently to rock said member first in one and then in the other direction, a rock shaft journaled in said frame and provided with arms, links pivotally connected with said frame and with said carriage and also with each other, a link pivotally connected with adjacent ends of said first-named links and pivotally connected with one of said arms, a link pivotally connected with the other of said arms, but detachable therefrom, and pivotally connected with said oscillatory member, and a hand lever mounted on said shaft.

9. In a machine of the class described, a frame and a column, a reciprocating carriage on said frame, a tool-carrying ram slidingly arranged on said column, driving means for said ram, means to change the direction of said driving means, means intermittently to actuate said carriage first in one and then in other direction, means to operate said carriage-actuating means from said driving means and means to operate said direction-changing means after said carriage-actuating means begins to be operated.

10. The combination, in a machine of the class described, with a frame, and a carriage slidingly arranged on said frame, of oscillatory members supported from said frame, rotating means to actuate one of said members first in one and then in the other direction, means to change the direction of said rotating means, means to actuate said carriage from said member, means to actuate the other of said members from the first, after the latter has moved a distance independently, and means to actuate said direction changing means from said last-named member.

11. The combination, in a machine of the class described, with a frame, a carriage slidingly arranged on said frame, a shaft, a member mounted on and secured to said shaft and provided with dogs, driving means for said shaft, and means to reverse said driving means, of a rock shaft journaled in said frame, an arm loosely mounted on said second rock shaft, and extending into the path of said dogs, mechanism between said carriage and said arm to cause said carriage to be moved by said arm, an arm mounted on and secured to said rock shaft, means adapted to actuate said second from said first arm, after the latter has moved a distance independently, and connecting means between said second arm and said reversing means.

12. The combination, in a machine of the class described, with a frame and a column, a tool-carrying ram arranged to reciprocate on said column, means to actuate said ram, means to change the direction of said actuating means, and a rotary member driven in opposite directions by said actuating means, of a work-holder carriage slidingly arranged on said frame, an oscillatory arm supported from said frame and adapted to be actuated in opposite directions by said rotary member, operating mechanism between said carriage and said arm, a second arm supported from said frame and adapted to be operated by the first, and mechanism between said second arm and said direction-changing means to cause the latter to be operated after said carriage commences to move.

13. The combination, in a machine of the class described, with a frame and a column, and a tool-carrying ram supported by said column, of rotary means to actuate said ram, driving mechanism for said rotary means, said mechanism consisting in part of a shaft and two pulleys loosely mounted thereon, a clutch rotatably secured to said shaft but adapted to slide thereon, and to be moved into frictional engagement with either of said pulleys, a rod secured to said clutch, a spool mounted on said rod, a lever pivotally supported from said frame, and having a yoke in engagement with said spool, a rock shaft provided with arms, a link connecting said lever with one of said arms, and means intermittently to actuate the other of said arms in opposite directions.

14. The combination, in a machine of the class described, with a frame and a column, and a tool-carrying ram supported by said column, of rotary means to actuate said ram, driving mechanism for said rotary means, said mechanism consisting in part of a shaft and two pulleys loosely mounted thereon, a clutch rotatably secured to said shaft, but adapted to slide thereon, and to be moved into frictional engagement with either of said pulleys, a rod secured to said clutch, a spool mounted on said rod, a bell-crank-lever pivotally supported from said frame, and having a yoke in engagement with said spool, a rock shaft provided with arms, a link connecting one arm of said bell-crank-lever with one of said first-named arms, means intermittently to actuate the other of said arms in opposite directions, and a spring-pressed pin in the path of the other bell-crank-lever arm.

15. In a machine of the class described, a reciprocating tool-carrying ram, a carriage, automatic means intermittently to actuate said carriage toward and away from said ram, and permit the carriage to rest at each end of its travel, work-holding means mounted on said carriage, and automatic means to cause said work-holding means to move the work across and in contact with the tool carried by said ram, and partially rotate said work.

16. In a machine of the class described, a reciprocating tool-carrying ram, a carriage, work-holding mechanism mounted on said carriage, means to cause said work-holding mechanism to move the work across the tool carried by said ram, and partially rotate said work, and means to actuate said carriage away from said ram to permit said workholding means to be moved and rotated in one direction, and to actuate said carriage towards said ram to enable said work-holding means to be moved and rotated in the other direction with the work in contact with the tool.

17. In a machine of the class described, a reciprocating tool-carrying ram, a carriage, work-holding and work-indexing mechanisms mounted on said carriage, means to cause said work-holding mechanism to move the work across the tool carried by said ram, and partially rotate said work, means to cause said work-indexing mechanism to operate on the work, and means to actuate said carriage away from said ram to permit said workholding means to be moved and rotated in one direction to actuate the work without contacting with said tool, and to actuate said carriage toward said ram to enable said work-holding means to be moved and rotated in the other direction with the work in contact with the tool.

18. In a machine of the class described, a reciprocating tool-carrying ram, reciprocating and rotatable work-holding means, and means traveling with said ram and in engagement with said work-holding means to operate the latter.

19. In a machine of the class described, a reciprocating tool-carrying ram, a carriage, means to actuate said carriage toward and away from said ram, reciprocating and rotatable work-holding means mounted on said carriage, and means traveling with said ram in engagement with said work-holding means to operate the latter.

20. In a machine of the class described, a reciprocating tool-carrying ram, reciprocating and rotatable work-holding means, rotatable work-indexing means, means traveling with said ram and in engagement with said work-holding means to operate the latter, and means to operate said work-indexing means from said work-holding means.

21. In a machine of the class described, a reciprocating tool-carrying ram, a carriage, means to actuate said carriage toward and away from said ram, reciprocating and rotatable work-holding means mounted on said carriage, means traveling with said ram and in engagement with said work-holding means to operate the latter, and means to operate said work-indexing means from said work-holding means, the construction and arrangement of parts being such that the work-holding means carries the work across the path of said tool from opposite directions, but permits said work to contact with said tool only while the same is moving in one direction.

22. In a machine of the class described, a reciprocating tool-carrying ram, a support, a slide mounted at an incline on said support, said slide being provided with work-holding means and with work-rotating means, means to actuate said slide on said support, and means to actuate said work-rotating means from said slide.

23. In a machine of the class described, a reciprocating tool-carrying ram, a carriage, means to actuate said carriage toward and away from said ram, a support on said carriage, a slide mounted at an incline on said support, said slide being provided with work-holding means and with work-rotating means, means to actuate said slide on said support, and means to actuate said work-rotating means from said slide.

24. In a machine of the class described, a reciprocating tool-carrying ram, a support, a slide mounted at an incline on said support, said slide being provided with work-holding means and with work-rotating means, and means to actuate said work-rotating means from said support.

25. In a machine of the class described, a reciprocating tool-carrying ram, a carriage, means to actuate said carriage toward and away from said ram, a support on said carriage, a slide mounted at an incline on said support, slide being provided with work-holding means and with work-rotating means, means to actuate said slide from said ram, and means to actuate said work-rotating means from said support.

26. In a machine of the class described, a reciprocating tool-carrying ram, a support, a slide mounted on said support and provided with work-holding means and with indexing means, means to actuate said slide on said support, and means to actuate said indexing means from said support.

27. In a machine of the class described, a reciprocating tool-carrying ram, a carriage, means to actuate said carriage toward and away from said ram, a support on said carriage, a slide mounted on said support, said slide being provided with work-holding means and with indexing means, means to actuate said slide on said support, and means to actuate said indexing means from said support.

28. In a machine of the class described, a reciprocating tool-carrying ram, a support, a slide mounted at an incline on said support, said slide being provided with work-holding means, work-rotating means, and indexing means, means to actuate said slide on said support, and means to actuate said work-rotating means and said indexing means from said support.

29. In a machine of the class described, a reciprocating tool-carrying ram, a carriage, means to actuate said carriage toward and away from said ram, a support on said carriage, a slide mounted at an incline on said support, said slide being provided with work-holding means, work-rotating means, and indexing means, means to actuate said slide on said support, and means to actuate said work-rotating means and said indexing means from said support.

30. In a machine of the class described, a reciprocating tool-carrying ram, a support, a slide mounted on said support, said slide being provided with work-holding means and with indexing means, means to actuate said slide from said ram, and means to actuate said indexing means from said support.

31. In a machine of the class described, a reciprocating tool-carrying ram, a carriage, means to actuate said carriage toward and away from said ram, a support on said carriage, a slide mounted on said support, said slide being provided with work-holding means and with indexing means, means to actuate said slide from said ram, and means to actuate said indexing means from said support.

32. In a machine of the class described, a reciprocating tool-carrying ram, a support, a slide mounted at an incline on said support, said slide being provided with work-holding means, work-rotating means, and indexing means, means to actuate said slide from said ram, and means to actuate said work-rotating means and said indexing means from said support.

33. In a machine of the class described, a reciprocating tool-carrying ram, a carriage, means to actuate said carriage toward and away from said ram, a support on said carriage, a slide mounted at an incline on said support, said slide being provided with work-holding means, work-rotating means, and indexing means, means to actuate said slide from said ram, and means to actuate said work-rotating means and said indexing means from said support.

34. In a machine of the class described, a reciprocating tool-carrying ram provided with a cam-plate adapted to traverse the work a distance equal to or greater than the chord of said work, a carriage, means to actuate said carriage toward and away from said ram, a support on said carriage, a slide mounted at an incline on said support, said slide having a part in the path of said cam-plate, and being provided with work-holding means and with work-rotating means, a spring adapted to retain said part in said path, and means to actuate said work-rotating means from said support.

35. In a machine of the class described, a reciprocating tool-carrying ram provided with a cam-plate adapted to traverse the work a distance equal to or greater than the chord of said work, a carriage, means to actuate said carriage toward and away from said ram, a support on said carriage, a slide mounted on said support, said slide having a part in the path of said cam-plate, and being provided with work-holding means and with indexing means, a spring adapted to retain said part in said path, and means to actuate said indexing means from said support.

36. In a machine of the class described, a reciprocating tool-carrying ram provided with a cam-plate adapted to traverse the work a distance equal to or greater than the chord of said work, a carriage, means to actuate said carriage toward and away from said ram, a support on said carriage, a slide mounted at an incline on said support, said slide having a part in the path of said cam-plate, and being provided with work-holding means, work-rotating means, and indexing means, a spring adapted to retain said part in said path, and means to actuate said work-rotating means and said indexing means from said support.

37. In a machine of the class described, a bed, a slide on said bed, said slide being provided with means to attach work thereto, a segmental gear mounted on said bed, and having a pitch diameter that agrees with that of the work, means to actuate said work-attaching means from said segmental-gear, means to reciprocate said slide on said bed, and means partially to rotate said segmental-gear when said slide is actuated.

38. In a machine of the class described, a bed, a slide on said bed, said slide being provided with means to attach work thereto and with indexing means, a segmental-gear mounted on said bed, and having a pitch diameter that agrees with that of the work, means to actuate said work-attaching means from said segmental-gear, means to reciprocate said slide on said bed, and means to actuate said indexing means when said slide is actuated in one direction.

39. In a machine of the class described, a bed, a slide on said bed, said slide being provided with means to attach work thereto, a segmental-gear mounted on said bed, and having a pitch diameter that agrees with that of the work, means to reciprocate said slide on said bed, means partially to rotate said segmental-gear when said slide is actuated, an index-wheel secured to said work-attaching means, and means, carried by said segmental-gear to impart additional rotary motion to said index-wheel, when said slide moves in one direction, and thereby actuate said index-wheel the required amount to locate the work in position for the next succeeding slot to be cut thereon.

40. In a machine of the class described, a bed provided with a rack, a slide on said bed, said slide being provided with a work-spindle, a segmental-gear loosely mounted on said slide, a pinion mounted on said slide and intermeshing with said rack and said segmental-gear, an index-wheel mounted on and secured to said spindle, a spring-pressed detent mounted on said segmental-gear, adapted to engage said index-wheel, and provided with a spring-pressed pawl also adapted to engage said index-wheel, a spring between said slide and said segmental-gear, and means to actuate said slide against the resiliency of said spring and cause said segmental-gear, and said index-wheel through said detent, to be partially rotated against the force of said spring, and to restore the parts to the action of said spring, intermittently.

41. In a machine of the class described, a bed provided with a rack, a slide on said bed, said slide being provided with a work spindle, a segmental-gear loosely mounted on said slide, a pinion mounted on said slide and intermeshing with said rack and said segmental-gear, an index-wheel mounted on and secured to said spindle, a spring-pressed detent mounted on said segmental-gear, adapted to engage said index-wheel, and provided with a spring-pressed pawl also adapted to engage said index-wheel, a spring between said slide and said segmental-gear, means to actuate said slide against the force of said spring and cause said segmental-gear, and said index-wheel through said detent, to be partially rotated against the force of said spring, and to restore the parts to the action of said spring, intermittently, and a spring-pressed dog mounted on said bed in the path of said detent, whereby said detent and pawl are actuated, when said slide is moved in one direction, to release said segmental-gear and actuate said index-wheel, respectively.

42. In a machine of the class described, a slide, a work spindle journaled in said slide, and provided with an exterior member, means to secure the work to said spindle, means to rotate said spindle, and a tension device for said spindle, said device comprising a spring attached to said slide and having a part to bear on said exterior member.

43. The combination, in a machine of the class described, with a frame and a column, a carriage on said frame, a ram slidingly arranged on said column, a broach carried by said ram, driving mechanism for said ram, reversing mechanism for said driving mechanism, and actuating means for said carriage, said actuating means being intermittently operated by said driving mechanism, and said reversing mechanism and said actuating means being timed to cause the former to operate after the latter has begun to operate, of a support on said carriage, a slide arranged at an incline on said support, and provided with work-holding means and with work-rotating means, and means operating from said ram to actuate said work-rotating means while said broach is making its cut.

44. The combination, in a machine of the class described, with a frame and a column, a carriage on said frame, a ram slidingly arranged on said column, a broach carried by said ram, driving mechanism for said ram, reversing mechanism for said driving mechanism, and actuating means for said carriage, said actuating means being intermittently operated by said driving mechanism, and said reversing mechanism and said actuating means being timed to cause the former to operate after the latter has begun to operate, of a support on said carriage, a slide on said support, and provided with work-holding means and indexing means, and means operated from said ram to actuate said indexing means after said broach has made its cut.

45. The combination, in a machine of the class described, with a frame and a column, a carriage on said frame, a ram slidingly arranged on said column, a broach carried by said ram, driving mechanism for said ram, reversing mechanism for said driving mechanism, and actuating means for said carriage, said actuating means being intermittently operated by said driving mechanism, and said reversing mechanism and said actuating means being timed to cause the former to operate after the latter has begun to operate, of a support on said carriage, a slide arranged at an incline on said support, and provided with work-holding means, work-rotating means, and indexing means, and means operated from said ram to actuate said work-rotating means while said broach is making its cut, and to actuate said indexing means after said broach has made said cut.

JULIAN L. PERKINS.
HIRAM D. CROFT.